(12) United States Patent
Kim et al.

(10) Patent No.: US 9,051,632 B2
(45) Date of Patent: Jun. 9, 2015

(54) BRAKE DISC USING DIFFERENT MATERIALS

(75) Inventors: Yoon Cheol Kim, Seoul (KR); Jae Young Lee, Gyeonggi-do (KR); Seong Jin Kim, Gyeonggi-do (KR); Jai Min Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 281 days.

(21) Appl. No.: 13/323,316

(22) Filed: Dec. 12, 2011

(65) Prior Publication Data

US 2013/0043099 A1    Feb. 21, 2013

(30) Foreign Application Priority Data

Aug. 16, 2011   (KR) .................. 10-2011-0081096

(51) Int. Cl.
| | |
|---|---|
| *F16D 65/12* | (2006.01) |
| *C22C 21/06* | (2006.01) |
| *C22C 21/08* | (2006.01) |
| *C22C 37/10* | (2006.01) |
| *C22C 38/04* | (2006.01) |
| *C22C 38/40* | (2006.01) |
| *F16B 5/04* | (2006.01) |
| *F16D 65/02* | (2006.01) |

(52) U.S. Cl.
CPC . *C22C 21/06* (2013.01); *F16B 5/04* (2013.01); *C22C 21/08* (2013.01); *C22C 37/10* (2013.01); *C22C 38/04* (2013.01); *C22C 38/40* (2013.01); *F16D 2065/1328* (2013.01); *F16D 2065/1348* (2013.01); *F16D 2065/1392* (2013.01); *F16D 2200/0013* (2013.01); *F16D 2200/003* (2013.01)

(58) Field of Classification Search
USPC .......................................... 188/218 XL, 18 A
See application file for complete search history.

(56) References Cited

U.S. PATENT DOCUMENTS

| 3,773,153 | A | * | 11/1973 | Smirl .................. 188/218 XL |
| 6,247,562 | B1 | * | 6/2001 | Gotti et al. ............. 188/218 XL |
| 6,357,561 | B2 | * | 3/2002 | Ruiz ..................... 188/218 XL |
| 7,077,247 | B2 | * | 7/2006 | Burgoon et al. ........ 188/218 XL |
| 8,418,817 | B2 | * | 4/2013 | Visca et al. ............. 188/218 XL |
| 2001/0032761 | A1 | * | 10/2001 | Ruiz ..................... 188/218 XL |
| 2004/0178030 | A1 | * | 9/2004 | Pacchiana et al. ....... 188/218 XL |

(Continued)

FOREIGN PATENT DOCUMENTS

| JP | 10-115336 A | 5/1998 |
| KR | 10-2002-0051720 A | 6/2002 |
| WO | 2009-026976 A1 | 3/2009 |

*Primary Examiner* — Robert A Siconolfi
*Assistant Examiner* — James Hsiao
(74) *Attorney, Agent, or Firm* — Mintz Levin Cohn Ferris Glovsky and Popeo, P.C.; Peter F. Corless

(57) ABSTRACT

A brake is disclosed which includes a disc plate is made of a first material, and an insert aperture is formed through the central portion of the disc plate. Coupling depressions are formed around the inner edge of the insert aperture, and a rivet aperture is formed in each of protrusion portions provided between the coupling depressions. A hat part is made of a second material and is inserted into the insert aperture. Coupling protrusions are provided around the outer edge of the hat part. A rivet aperture is formed in each of the coupling protrusions. Straps are disposed such that each strap passes over both the corresponding rivet aperture of the disc plate and the corresponding rivet aperture of the hat part. The rivets are inserted into the corresponding straps and the corresponding rivet apertures to fix the straps, the disc plate and the hat part together.

10 Claims, 4 Drawing Sheets

(56) References Cited

U.S. PATENT DOCUMENTS

| | | | |
|---|---|---|---|
| 2004/0182660 A1* | 9/2004 | Cavagna et al. | 188/218 XL |
| 2009/0078515 A1* | 3/2009 | Xia | 188/218 XL |
| 2010/0051397 A1* | 3/2010 | Kim et al. | 188/218 XL |
| 2010/0101902 A1* | 4/2010 | Kano et al. | 188/218 XL |
| 2011/0100773 A1* | 5/2011 | Hidaka et al. | 188/218 XL |

* cited by examiner

BRAKE DISC USING DIFFERENT MATERIALS

CROSS-REFERENCE TO RELATED APPLICATION

This application claims under 35 U.S.C. §119(a) the benefit of Korean Patent Application No. 10-2011-0081096 filed on Aug. 16, 2011 the entire contents of which are incorporated herein by reference.

BACKGROUND OF THE INVENTION

1. Field of the Invention

The present invention relates to a brake disc in which a disc plate and a hat part are made of different materials and are mechanically coupled to each other by rivets.

2. Description of the Related Art

Because of the shortage of oil and climate changes, worldwide automobile manufacturers have worked hard to develop techniques to enhance fuel efficiency. In particular, techniques for reducing the weight of a vehicle without lowering the performance have recently attracted attention. More specifically, a reduction in the weight of a lower portion of a vehicle directly affects an increase in the performance and fuel efficiency of the vehicle. Further, reducing the unsprung mass, which directly pertains to a wheel drive load, effectively enhances the fuel efficiency.

Among such technology, the techniques for reducing the weight associated with brake discs, which takes up a large portion of the unsprung mass, have been popular among automotive manufacturing companies. Particularly, the use of a combination of aluminum and grey cast iron to reduce the weight of the brake disc without lowering its performance.

As shown in FIG. 1, a conventional brake disc 10 includes a hat part 30 which is mounted to a hub, and a disc plate 20 which generates friction when braking. The hat part 20 and the disc plate 20 are typically made of grey cast iron which contains flake graphite and have superior braking characteristics, for example, superiority in vibration damping capacity, damping ability, heat resistance and a lubrication function.

However, because the specific gravity of grey cast iron is 7.2 g/cm$^3$, the brake disc is comparatively heavy, resulting in a reduction of fuel efficiency. Therefore, to mitigate this problem, it would be beneficial to develop a brake disc using different materials including grey cast iron and aluminum. Further, a disc structure which can reliably mechanically couple the two elements made of the different materials to each other to satisfy the desired performance, for example, in durability, heat resistance, distortion resistance, etc., would be beneficial in further reducing the overall weight of the vehicle.

It is to be understood that the foregoing description is provided to merely aid the understanding of the present invention, and does not mean that the present invention falls under the purview of the related art which was already known to those skilled in the art.

SUMMARY OF THE INVENTION

Accordingly, the present invention has been made keeping in mind the above problems occurring in the prior art, and an object of the present invention is to provide a brake disc using two different materials which is configured such that an element made of aluminum and an element made of grey cast iron are coupled to each other by a unique coupling structure using straps and rivets, so that the weight of the brake disc that takes up a large portion of the weight of unsprung mass can be reduced without reducing the performance of the brake disc.

In order to accomplish the above object, the present invention provides a brake disc using two different materials, including: a disc plate made of grey cast iron, the disc plate having an insert aperture formed through a central portion thereof, with a plurality of coupling depressions formed around a circumferential inner edge of the insert aperture, and a first rivet aperture formed in each of protrusion portions provided between the coupling depressions; a hat part made of an aluminum alloy, the hat part inserted into the insert aperture of the disc plate and provided with a plurality of coupling protrusions provided around a circumferential outer edge of the hat part, the coupling protrusions having a shape corresponding to a shape of the coupling depressions, with a second rivet aperture formed in the each of the coupling protrusions; a plurality of straps disposed in such a way that each of the straps passes over both the corresponding first rivet aperture of the disc plate and the corresponding second rivet aperture of the hat part; and a plurality of rivets inserted into the corresponding straps and the corresponding first and second rivet apertures to fix the straps, the disc plate and the hat part together.

The coupling depressions of the disc plate may form a wave shape along the circumferential inner edge of the insert aperture. Furthermore, the coupling protrusions of the hat part may form a wave shape corresponding to the wave shape formed by the coupling depressions. Each of the rivets may have a cylindrical shape having a predetermined length, and opposite ends of the rivet may be pressed into flange shapes when coupling the rivet to the disc plate and the hat part, wherein the flange-shaped opposite ends respectively come into close contact with the disc plate and the hat part under pressure.

The circumferential inner edge of the insert aperture of the disc plate and the circumferential outer edge of the hat part may have shapes corresponding to each other and be spaced apart from each other by a predetermined distance when in a coupled state. Furthermore, opposite ends of each of the straps may be located on the corresponding first rivet apertures of the disc plate, and a medial portion thereof may be located on the corresponding second rivet aperture of the hat part.

The straps may be alternately disposed on upper and lower surfaces of the disc plate, and the opposite ends of each of straps may be closely fastened to the upper or lower surface of the disc plate by the rivets. In addition, a flange may be formed on an upper end of the disc plate along the circumferential inner edge of the insert aperture, wherein the coupling depressions may be formed in the flange, and the coupling protrusions may be provided around a circumference of a lower end of the hat part.

In addition, each of the rivets may be made of a stainless steel alloy. The disc plate may be made of grey cast iron, a main component of which is iron, and which contains 3.0 to 3.8 wt % of carbon, 1.0 to 2.8 wt % of silicon, 1.0 wt % or less of manganese (greater than 0 wt %), 0.2 wt % or less of phosphorus (greater than 0 wt %), 0.15 wt % or less of sulfur (greater than 0 wt %), and other indispensable impurities, and the hat part may be made of an alloy, a main component of which is aluminum, and which contains 0.1 wt % or less of copper (greater than 0 wt %), 1.3 wt % or less of silicon (greater than 0 wt %), 0.6 to 3.0 wt % of magnesium, 0.25 wt % or less of zinc (greater than 0 wt %), 0.5 wt % or less of iron (greater than 0 wt %), 1.0 wt % or less of manganese (greater than 0 wt %), 0.35 wt % or less of chrome (greater than 0 wt %), and other indispensable impurities.

Each of the straps may be made of high-tensile spring steel, a main component of which is iron, and which contains 0.8 to 1.1 wt % of carbon, 0.035 wt % or less of silicon (greater than 0 wt %), 0.5 wt % or less of manganese (greater than 0 wt %), 0.03 wt % or less of phosphorus (greater than 0 wt %), 0.03 wt % or less of sulfur (greater than 0 wt %), and other indispensable impurities, and the rivet may be made of a stainless steel alloy, a main component of which is iron, and which contains 0.15 wt % or less of carbon (greater than 0 wt %), 1.0 wt % or less of silicon (greater than 0 wt %), 2.0 wt % or less of manganese (greater than 0 wt %), 0.05 wt % or less of phosphorus (greater than 0 wt %), 0.1 wt % or less of sulfur (greater than 0 wt %), 6 to 10 wt % of nickel, 16 to 20 wt % of chrome, and other indispensable impurities.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a brake disc using different materials according to an embodiment of the present invention will be described in detail with reference to the attached drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
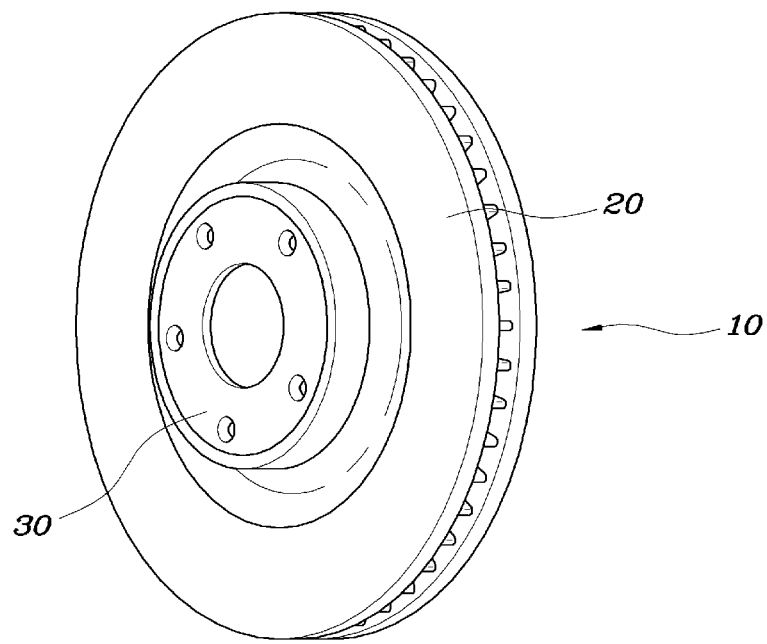
FIG. 1 is a perspective view showing a conventional brake disc.
Figure 2:
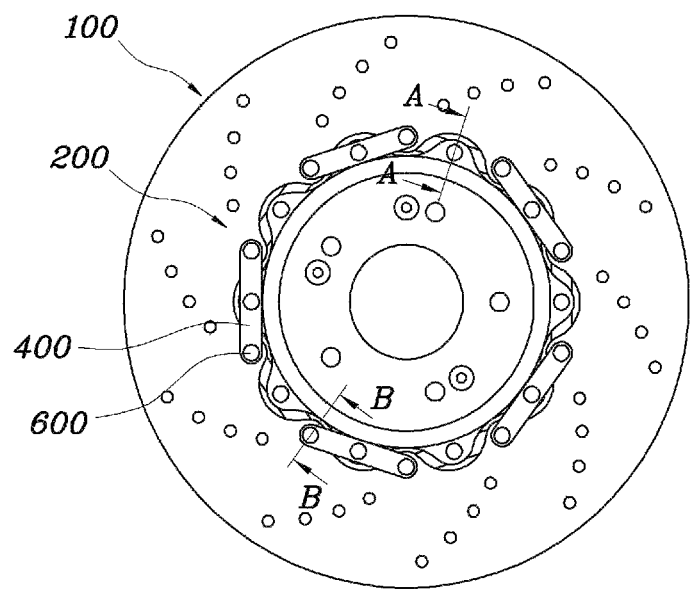
FIG. 2 is a front view of a brake disc using different materials, according to an exemplary embodiment of the present invention.
Figure 3:
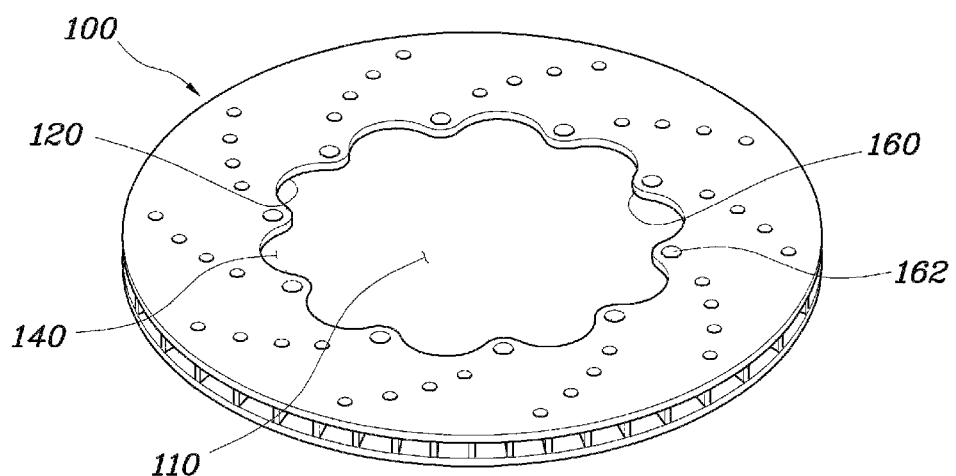
FIGS. 3 through 6 are perspective views respectively showing elements of the brake disc of FIG. 2.
Figure 4:
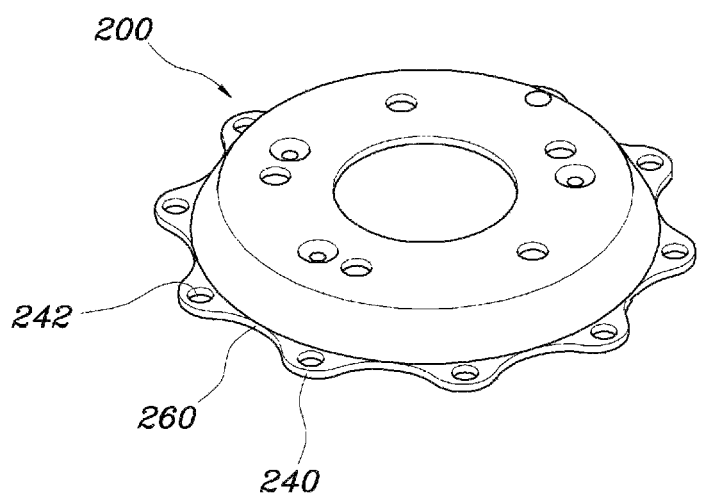
Figure 5:
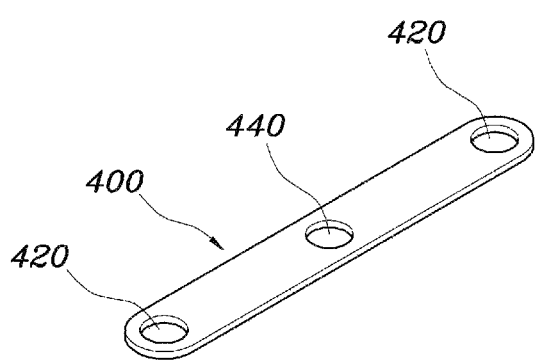

FIG. 2 is a front view of the brake disc according to the embodiment of the present invention. FIGS. 3 through 6 are perspective views respectively showing elements of the brake disc of FIG. 2. The brake disc according to the present invention includes a disc plate 100, a hat part 200, straps 400 and rivets 600. The disc plate 100 in the illustrative embodiment of the present invention is made of grey cast iron and the hat part 200 is made of a different material, preferably aluminum alloy. An insert aperture 110 is formed through a central portion of the disc plate 100. A plurality of coupling depressions 140 are formed around a circumferential inner edge of the insert aperture 110. A rivet aperture 162 is formed in each of protrusion portions 160 provided between the coupling depressions 140. The hat part 200 is made of an aluminum alloy and is inserted into the insert aperture 110 of the disc plate 100. A plurality of coupling protrusions 240 which have a shape corresponding to that of the coupling depressions 140 are provided around a circumferential outer edge of the hat part 200. A rivet aperture 242 is formed in each coupling protrusion 240. The straps 400 are disposed in such a way that each strap 400 passes over both the corresponding rivet aperture 162 of the disc plate 100 and the corresponding rivet aperture 242 of the hat part 200. The rivets 600 are inserted into the corresponding straps 400 and the corresponding rivet apertures 162 and 242 to fix the straps 400, the disc plate 100 and the hat part 200 together.

Preferably, the disc plate 100 is formed by molding using grey cast iron, and the hat part 200 is formed by forging using an aluminum alloy. Thereafter, the disc plate 100 and the hat part 200 are coupled to each other and are processed to produce a complete product. Due to such a manufacturing process, the production cost can be reduced.

The insert aperture 110 is formed in the central portion of the disc plate 100, and the hat part 200 is inserted into the insert aperture 110 provided to mechanically couple the disc plate 100 with the hat part 200 thereby creating a unique structure is which is applied to minimize heat transfer between the disc plate 100 and the hat part 200 and increase the heat dissipation effect, thus preventing the elements from being distorted by heat. In detail, the disc plate 100 is made of grey cast iron and has the insert aperture 110 in the central portion thereof. The coupling depressions 140 are formed around the circumferential inner edge of the insert aperture 110. The rivet apertures 162 are formed in the respective protrusion portions 160 provided between the coupling depressions 140.

The hat part 200 is installed in the insert aperture 110. The hat part 200 is made of a lighter material than the disc part, preferably an aluminum alloy, and is coupled to the insert aperture 110 of the disc plate 100, wherein the coupling protrusions 240 having the shape corresponding to that of the coupling depressions 140 are provided around the circumferential outer edge of the hat part 200. The rivet apertures 242 are formed in the respective coupling protrusions 240.

Due to this coupling structure between the coupling depressions 140 and the coupling protrusions 240, the disc plate 100 and the hat part 200 can reliably resist braking torque. Furthermore, the strength of the brake disc can be further enhanced by the straps 400 and the rivets 600. In detail, the straps 400 are disposed both on the corresponding rivet apertures 162 of the disc plate 100 and on the corresponding rivet apertures 242 of the hat part 200. The strap 400 is fixed to the disc plate 100 and the hat part 200 by the rivets 600 inserted into the strap 400 and the corresponding rivet apertures 162 and 242.

In the illustrative embodiment, as shown in the drawings, the coupling depressions 140 of the disc plate 100 form a wave shape along the circumferential inner edge of the insert aperture 110. The coupling protrusions 240 of the hat part 200 form a wave shape corresponding to the wave shape of the coupling depression 140. That is, the disc plate 100 and the hat part 200 have the protrusion portions 160 and 240 and the depression portions 140 and 260 which have the same radius of curvature so that the two elements precisely engage with each other. Thereby, not only is the braking torque uniformly dispersed to the straps 400 and the rivets 600 but the weight is also uniformly distributed. Therefore, the steerability of the vehicle can be enhanced.

Figure 6:
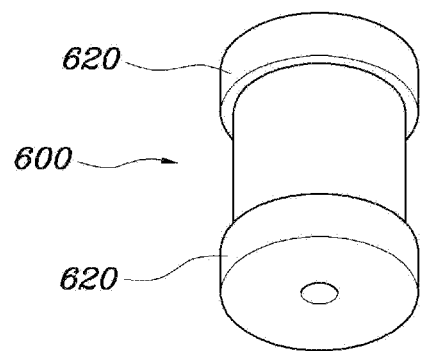

Meanwhile, each rivet 600 has a cylindrical shape of a predetermined length. Opposite ends 620 of the rivet 600 have flange shapes which are pressed when coupled so that they come into close contact with the disc plate 100 and the hat part 200 under pressure. As shown in FIG. 6, the opposite ends 620 of the rivet 600 are strongly pressed during assembly so that they form flange shapes. Thereby, the ability of the straps 400 and the elements to be put into close contact can be enhanced.

Further, the circumferential inner edge of the insert aperture 110 of the disc plate 100 and the circumferential outer edge of the hat part 200 have shapes that correspond to each other, and they are preferably spaced apart from each other by a predetermined distance when in the assembled state. As shown in FIG. 2, because the disc plate 100 and the hat part 200 have the shapes corresponding to each other and are spaced apart from each other by a predetermined distance, the difference in the degree of heat expansion between the different materials can be compensated for. Further, heat is prevented from being directly transferred from the disc plate 100 to the hat part 200. Preferably, the distance between the circumferential inner edge of the insert aperture 110 and the circumferential outer edge of the hat part 200 must be appropriate for bringing the two elements into contact with each other when expanding due to heat so that the braking torque is reliably transmitted therebetween.

Figure 7:
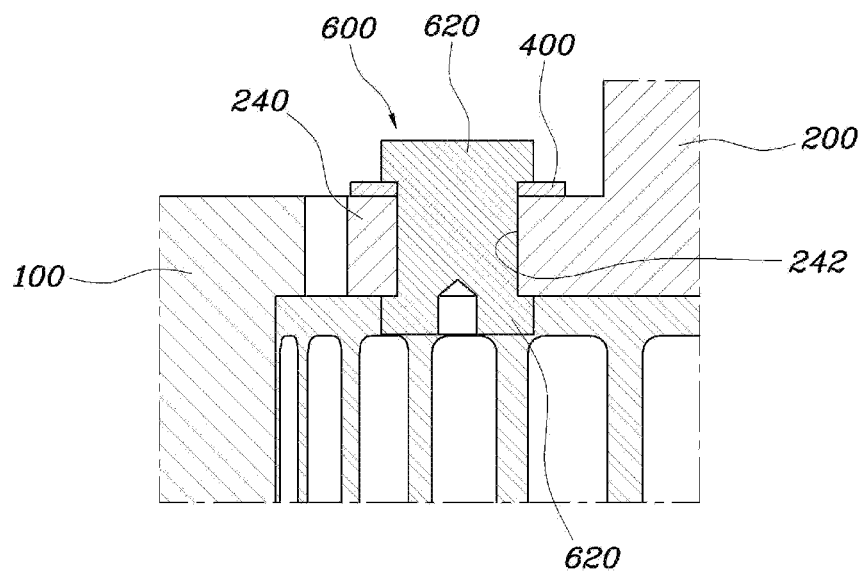
FIG. 7 is a sectional view taken along the line A-A of FIG. 2.
Figure 8:
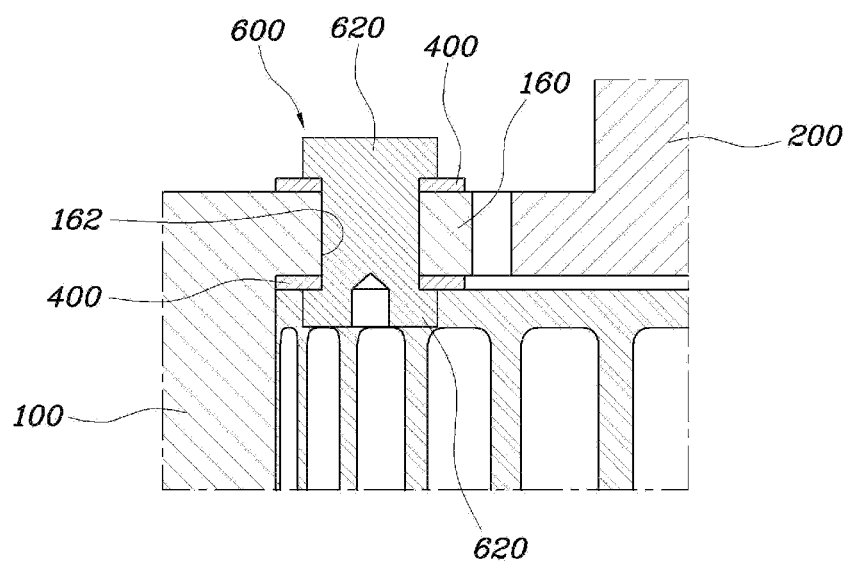
FIG. 8 is a sectional view taken along the line B-B of FIG. 2.

Meanwhile, as shown in FIG. 2, each strap 400 is disposed such that the opposite ends 420 thereof are located on the corresponding rivet apertures 162 of the disc plate 100 and a medial portion 440 thereof is located on the corresponding rivet aperture 242 of the hat part 200. Further, the straps 400 are alternately disposed on upper and lower surfaces of the disc plate 100. The opposite ends 420 of each strap 400 are closely fastened to the upper or lower surface of the disc plate 100 by the rivets 600. In detail, FIG. 7 is a sectional view taken along the line A-A of FIG. 2. FIG. 8 is a sectional view taken along the line B-B of FIG. 2. The coupling structure will be able to be clearly understood by referring to FIGS. 7 and 8.

In detail, the straps 400 are alternately disposed on the upper and lower surface of the disc plate 100 in a symmetrical shape. The opposite ends 420 of the straps 400 are closely fastened to the corresponding upper and lower surfaces of the disc plate 100 by the rivets 600. The medial portions 440 of the straps 400 are fastened, in the illustrative embodiment, only to the hat part 200 by the rivets 600. However, the present invention is not limited thereso. Thereby, the disc plate 100 and the hat part 200 are reliably coupled to each other. The rivets 600 may be configured such that the size of rivets 600 which are coupled to the disc plate 100 is different from that of rivets 600 which are coupled to the hat part 200.

Meanwhile, a flange 120 is formed on an upper end of the disc plate 100 along the circumferential inner edge of the insert aperture 110. The coupling depressions 140 are formed in the flange 120. The coupling protrusions 240 are provided around the circumference of a lower end of the hat part 200. Due to such a construction, the volumes of portions of the elements that participate in the coupling therebetween can be minimized, thus reducing the entire weight of the brake disc. Further, the rivet 400 may also be made of a stainless steel alloy, thus preventing the coupling force from becoming poorer because of corrosion.

The disc plate 100 having the above-mentioned construction may be made of grey cast iron, the main component of which is iron, and which contains 3.0 to 3.8 wt % of carbon, 1.0 to 2.8 wt % of silicon, 1.0 wt % or less of manganese (greater than 0 wt %), 0.2 wt % or less of phosphorus (greater than 0 wt %), 0.15 wt % or less of sulfur (greater than 0 wt %), and other indispensable impurities. The hat part 200 may be made of an alloy, the main component of which is aluminum, and which contains 0.1 wt % or less of copper (greater than 0 wt %), 1.3 wt % or less of silicon (greater than 0 wt %), 0.6 to 3.0 wt % of magnesium, 0.25 wt % or less of zinc (greater than 0 wt %), 0.5 wt % or less of iron (greater than 0 wt %), 1.0 wt % or less of manganese (greater than 0 wt %), 0.35 wt % or less of chrome (greater than 0 wt %), and other indispensable impurities.

The strap 400 may be made of high-tensile spring steel, the main component of which is iron, and which contains 0.8 to 1.1 wt % of carbon, 0.035 wt % or less of silicon (greater than 0 wt %), 0.5 wt % or less of manganese (greater than 0 wt %), 0.03 wt % or less of phosphorus (greater than 0 wt %), 0.03 wt % or less of sulfur (greater than 0 wt %), and other indispensable impurities. The rivet 600 is made of a stainless steel alloy, the main component of which is iron, and which contains 0.15 wt % or less of carbon (greater than 0 wt %), 1.0 wt % or less of silicon (greater than 0 wt %), 2.0 wt % or less of manganese (greater than 0 wt %), 0.05 wt % or less of phosphorus (greater than 0 wt %), 0.1 wt % or less of sulfur (greater than 0 wt %), 6 to 10 wt % of nickel, 16 to 20 wt % of chrome, and other indispensable impurities.

Furthermore, the disc plate 100 may be formed by molding using grey cast iron, and the hat part 200 may be formed by forging using an aluminum alloy, before the disc plate 100 and the hat part 200 are coupled to each other and are processed to produce a complete product, thus reducing the production cost.

As described above, in a brake disc using at least two different materials according to the present invention, the weight thereof can be reduced by about 2 kg, while at the same time providing superior braking characteristics which are equivalent to that of the conventional brake disc made of the single material of grey cast iron.

Furthermore, despite the brake disc of the present invention being made of two different materials (e.g., aluminum and grey cast iron), the disc is sufficiently strong and able to withstand the maximum braking torque of the vehicle because the components of the disc are reliably coupled to each other by straps and rivets. Moreover, the brake disc of the present invention has a unique structure and is configured such that heat transfer is minimized between the two different materials, so that heat distortion can be reliably prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A brake disc composed of two different materials, comprising:

a disc plate made of a first material, the disc plate having an insert aperture formed through a central portion thereof, with a plurality of coupling depressions formed around a circumferential inner edge of the insert aperture, and a first rivet aperture formed in each of protrusion portions provided between the coupling depressions;

a hat part made of a second material, the hat part being inserted into the insert aperture of the disc plate and provided with a plurality of coupling protrusions provided around a circumferential outer edge of the hat part, the coupling protrusions having a shape corresponding to a shape of the coupling depressions, with a second rivet aperture formed in the each of the coupling protrusions;

a plurality of straps disposed in such a way that each of the straps passes over both the corresponding first rivet aperture of the disc plate and the corresponding second rivet aperture of the hat part; and a plurality of rivets inserted into the corresponding straps and the corresponding first and second rivet apertures to fix the straps, the disc plate and the hat part together, wherein each of the rivets has a cylindrical shape having a predetermined length, and opposite ends of the rivet are pressed into flange shapes when coupling the rivet to the disc plate and the hat part, wherein the flange-shaped opposite ends respectively come into close contact with the disc plate and the hat part under pressure, and wherein opposite ends of each of the straps are located on the corresponding first rivet apertures of the disc plate, and a medial portion thereof is located on the corresponding second rivet aperture of the hat part.

2. The brake disc as set forth in claim 1, wherein the coupling depressions of the disc plate form a wave shape along the circumferential inner edge of the insert aperture.

3. The brake disc as set forth in claim 2, wherein the coupling protrusions of the hat part form a wave shape corresponding to the wave shape formed by the coupling depressions.

4. The brake disc as set forth in claim 1, wherein the circumferential inner edge of the insert aperture of the disc plate and the circumferential outer edge of the hat part have shapes corresponding to each other and are spaced apart from each other by a predetermined distance when in a coupled state.

5. The brake disc as set forth in claim 1, wherein the straps are alternately disposed on upper and lower surfaces of the disc plate, and the opposite ends of each of straps are closely fastened to the upper or lower surface of the disc plate by the rivets.

6. The brake disc as set forth in claim 1, wherein a flange is formed on an upper end of the disc plate along the circumferential inner edge of the insert aperture, wherein the coupling depressions are formed in the flange, and the coupling protrusions are provided around a circumference of a lower end of the hat part.

7. The brake disc as set forth in claim 1, wherein each of the rivets is made of a stainless steel alloy.

8. The brake disc as set forth in claim 1, wherein the disc plate is made of grey cast iron, a main component of which is iron, and which contains 3.0 to 3.8 wt % of carbon, 1.0 to 2.8 wt % of silicon, 1.0 wt % or less of manganese (greater than 0 wt %), 0.2 wt % or less of phosphorus (greater than 0 wt %), 0.15 wt % or less of sulfur (greater than 0 wt %), and other indispensable impurities, and the hat part is made of an alloy, a main component of which is aluminum, and which contains 0.1 wt % or less of copper (greater than 0 wt %), 1.3 wt % or less of silicon (greater than 0 wt %), 0.6 to 3.0 wt % of magnesium, 0.25 wt % or less of zinc (greater than 0 wt %), 0.5 wt % or less of iron (greater than 0 wt %), 1.0 wt % or less of manganese (greater than 0 wt %), 0.35 wt % or less of chrome (greater than 0 wt %), and other indispensable impurities.

9. The brake disc as set forth in claim 1, wherein each of the straps is made of high-tensile spring steel, a main component of which is iron, and which contains 0.8 to 1.1 wt % of carbon, 0.035 wt % or less of silicon (greater than 0 wt %), 0.5 wt % or less of manganese (greater than 0 wt %), 0.03 wt % or less of phosphorus (greater than 0 wt %), 0.03 wt % or less of sulfur (greater than 0 wt %), and other indispensable impurities, and the rivet is made of a stainless steel alloy, a main component of which is iron, and which contains 0.15 wt % or less of carbon (greater than 0 wt %), 1.0 wt % or less of silicon (greater than 0 wt %), 2.0 wt % or less of manganese (greater than 0 wt %), 0.05 wt % or less of phosphorus (greater than 0 wt %), 0.1 wt % or less of sulfur (greater than 0 wt %), 6 to 10 wt % of nickel, 16 to 20 wt % of chrome, and other indispensable impurities.

10. A brake disc composed of two different materials, comprising:

a disc plate made of a first material, the disc plate having an insert aperture formed through a central portion thereof, with a plurality of coupling depressions formed around a circumferential inner edge of the insert aperture, and a first rivet aperture formed in each of protrusion portions provided between the coupling depressions;

a hat part made of a second material, the hat part being inserted into the insert aperture of the disc plate and provided with a plurality of coupling protrusions provided around a circumferential outer edge of the hat part, the coupling protrusions having a shape corresponding to a shape of the coupling depressions, with a second rivet aperture formed in the each of the coupling protrusions;

a plurality of straps disposed in such a way that each of the straps passes over both the corresponding first rivet aperture of the disc plate and the corresponding second rivet aperture of the hat part; and a plurality of rivets inserted into the corresponding straps and the corresponding first and second rivet apertures to fix the straps, the disc plate and the hat part together, wherein opposite ends of each of the straps are located on the corresponding first rivet apertures of the disc plate, and a medial portion thereof is located on the corresponding second rivet aperture of the hat part.

* * * * *